(12) United States Patent
Brouwer et al.

(10) Patent No.: US 6,698,706 B1
(45) Date of Patent: Mar. 2, 2004

(54) DAMPING MECHANISM FOR A MIRROR OF A MOTOR VEHICLE

(75) Inventors: Stefan Frits Brouwer, The Hague (NL); Paulus Gerardus Maria Van Stiphout, Woerden (NL)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/763,519

(22) PCT Filed: Sep. 6, 1999

(86) PCT No.: PCT/NL99/00551

§ 371 (c)(1),
(2), (4) Date: Jun. 11, 2002

(87) PCT Pub. No.: WO00/13939

PCT Pub. Date: Mar. 16, 2000

(30) Foreign Application Priority Data

Sep. 4, 1998 (NL) .......................................... 1010013

(51) Int. Cl.$^7$ ................................................ A47G 1/24
(52) U.S. Cl. ...................................... 248/476; 359/876
(58) Field of Search ........................ 248/475.1, 476, 248/477, 478, 483; 359/871, 872, 850, 838, 841, 843, 844, 845, 846, 865, 878, 223, 224, 225, 226, 555, 556

(56) References Cited

U.S. PATENT DOCUMENTS

| | | | | |
|---|---|---|---|---|
| 4,171,873 A | * | 10/1979 | Repay et al. | 359/874 |
| 4,277,140 A | * | 7/1981 | Manzoni | 248/478 |
| 4,474,428 A | * | 10/1984 | Wunsch et al. | 359/877 |
| 4,678,295 A | * | 7/1987 | Fisher | 359/874 |
| 4,951,912 A | * | 8/1990 | Manzoni | 248/475.1 |
| 4,973,820 A | * | 11/1990 | Mittelhauser | 219/219 |
| 5,539,584 A | * | 7/1996 | Perry et al. | 359/874 |
| 5,818,650 A | * | 10/1998 | Nyhof et al. | 359/876 |
| 6,050,537 A | * | 4/2000 | Fimeri | 248/481 |
| 6,264,338 B1 | * | 7/2001 | MacFarland et al. | 359/871 |

* cited by examiner

Primary Examiner—Leslie A. Braun
Assistant Examiner—Kofi Schulterbrandt
(74) Attorney, Agent, or Firm—Roger A. Johnston

(57) ABSTRACT

In a mirror of a motor vehicle, a mirror support, having a mirror plate thereon, is movable about two mutually perpendicular axes relative to a mounting plate fixedly present in the housing of the mirror plate. Between the mirror support and the mounting plate, at least two damping elements are arranged, by which vibrations of the mirror plate in the housing are counteracted.

5 Claims, 3 Drawing Sheets

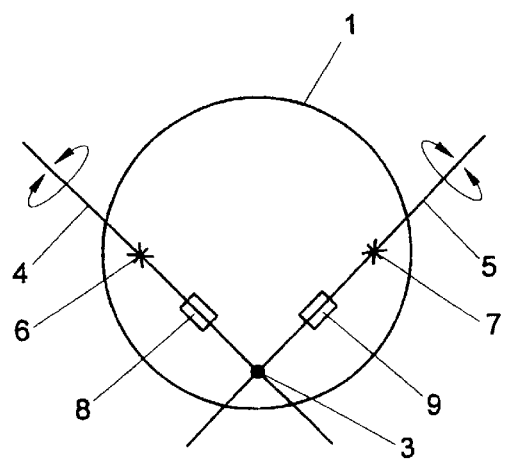
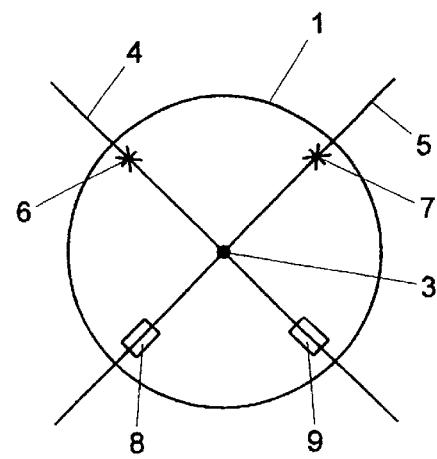
Fig. 1A  Fig. 1B
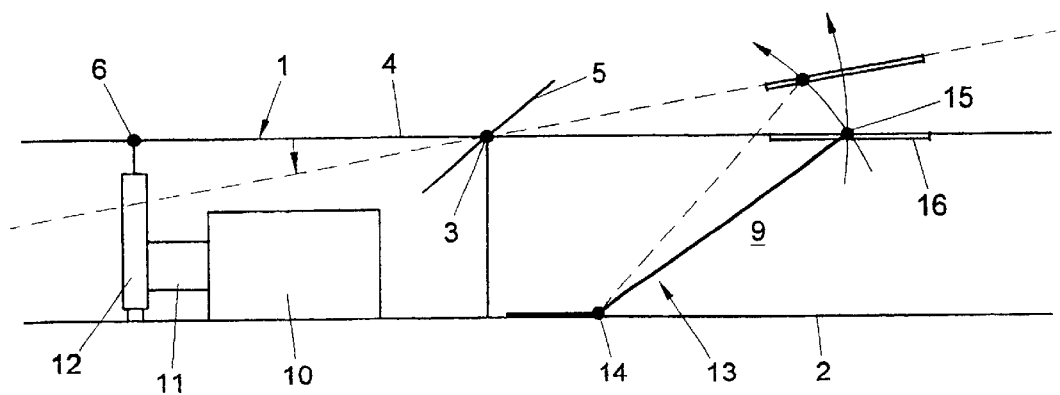
Fig. 2

DAMPING MECHANISM FOR A MIRROR OF A MOTOR VEHICLE

A damping mechanism for a mirror of a motor vehicle, wherein a mirror support, having a mirror plate thereon, is movable about two mutually perpendicular axes relative to a mounting plate fixedly present in the housing of the mirror plate, between the mirror support and the mounting plate at least two damping elements being arranged, each of said damping elements being made up of a slot present on the mirror support, or on the mounting plate, and a hinging supporting element present on the mounting plate or the mirror support, respectively, whose end is movable in a respective slot.

In such mirrors of motor vehicles, it is of great importance that the mirror plates, when not being adjusted, continue to take up a fixed position in the housing; vibrations to which the mirror plate will be subject owing to its adjustability about the axes mentioned must be counteracted as much as possible. Further, acoustic vibrations during adjustment of the mirror plate should be suppressed as much as possible.

A damping mechanism as described in the opening paragraph is known from U.S. Pat. No. 4,171,873. The hinging support element therein is formed by a spring wire damping element with one extending end anchoring the damping element by being received in a passage on the mirror support and the other extending end providing a runner-like portion to engage and slide with respect to a specific surface of an extension on the mounting plate.

The object of the invention is to improve and to simplify the known damping elements and to provide an entirely different type of damping mechanism.

To realize this object, according to the invention, the damping mechanism such as it is described in the preamble is characterized in that the supporting element, at the free end, can then be provided with a spherical projection which, upon movement of the mirror support relative to the mounting plate, moves through the slot in question. It is noted here that it is known from DE-A-19804360 to use a single similar construction of slot and supporting element between the mirror support and the mounting plate. This construction then serves as a lock against rotation.

To ensure that, upon a movement of the mirror support about one or both axes relative to the mounting plate, a sufficient damping is obtained at all times, at least two of the damping elements are arranged at a distance from the pivoting point of the mirror support relative to the mounting plate, the lines through the pivot points and each of the damping element centres including an angle of about 60° and 120°, preferably an angle of 90°.

In an electrically controlled mirror, the mirror plate is adjusted about the axes by two motor-driven spindles mounted on the mounting plate. Although, when in that case two damping elements are present, these can be arranged between the respective engagement points of the spindles on the mirror support and the pivoting point, it is preferred, for constructional reasons, to arrange the damping elements diametrically relative to the respective engagement points of the spindles on the mirror support, between the mirror support and the mounting plate. When four damping elements are present, two of them may be arranged, in the manner specified here, diametrically relative to the respective engagement points, and two others between these engagement points and the pivoting point.

In a simple and inexpensive embodiment, the supporting element is formed by a sheetlike element with a foldable edge which forms the hinge by which the supporting element is mounted on the mounting plate, or on the mirror support, for hinging motion, parallel to a respective axis.

The invention relates not only to a damping mechanism for a mirror of a motor vehicle, but also to this mirror itself, in other words, to a mirror for a vehicle, comprising a mirror support, having a mirror plate thereon, which is movable about two mutually perpendicular axes relative to a mounting plate fixedly present in the housing of the mirror plate, and which mirror includes, in accordance with the invention, the above-described damping elements.

The invention will now be further explained with reference to the drawings. In the drawings:

FIGS. 1A and 1B schematically show two possibilities of arranging the damping mechanism according to the invention;

FIG. 2 schematically shows the movement mechanism of a mirror according to the invention about an axis;

FIG. 4 is a perspective representation of an exemplary embodiment of the coupling between the mirror support and mounting plate, cooperating with the mirror support in FIG. 3 and arranged on the mounting plate;

FIG. 5 is a front view of the coupling in FIG. 4; while

In the figures, corresponding parts are denoted by the same reference numerals.

Figure 3:
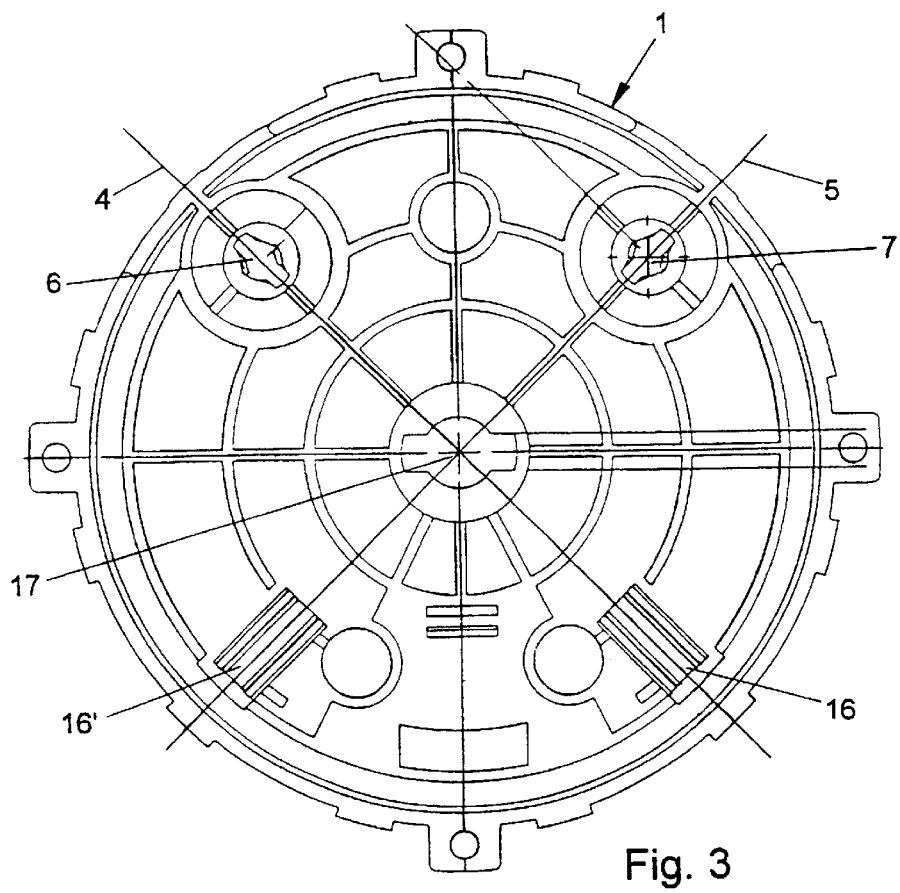
FIG. 3 shows an exemplary embodiment of a mirror support according to the invention.

The invention will be explained for an electrically controlled mirror. Electrically controlled mirrors for motor vehicles have been known for many years already. Such mirrors comprise a mounting support intended to be secured to a vehicle, and a mirror housing, movable relative thereto about a vertical axis. The rotation of the mirror housing relative to the mounting support can be electrically controlled. The mirror housing comprises a mounting plate on which the means are arranged to enable a mirror support, having a mounting plate thereon, to be moved about two mutually perpendicular axes relative to the mounting plate and hence relative to the mirror housing and the vehicle. These means comprise motors, transmission means and spindles engaging the mirror support. By energization of the motors, the spindles are displaced in their longitudinal direction, and the mirror support rotates about the pivoting point by which it is connected with the mounting plate. Since such a construction of a controlled mirror is known and does not form part of the invention, it will not be further discussed here.

To prevent vibrations and acoustic vibrations, such as they have already been indicated hereinbefore, in accordance with the invention, damping elements are present, which are active between the mounting plate and the mirror support.

In FIGS. 1A and 1B, it is schematically indicated where these damping elements can be disposed. In these figures, the mirror support is indicated at 1, while the pivoting point and the mutually perpendicular axes about which the mirror support 1 can rotate relative to the mounting plate 2 (see FIG. 2) are denoted by reference numerals 3, and 4, 5, respectively. To effect such a rotation, the spindles engage the mirror support 1 at points of engagement 6 and 7. Damping elements 8 and 9 are arranged between the mirror support 1 and the mounting plate 2 at the imaginary lines between the engagement points 6, 7 and the pivoting point 3. Depending on the position of the pivoting point 3, the damping elements 8 and 9 are located between the spindle engagement points 6, 7 and the pivoting point 3 (FIG. 1A) or diametrically relative to these engagement points 6, 7 (FIG. 1B).

Figures 4, 5:
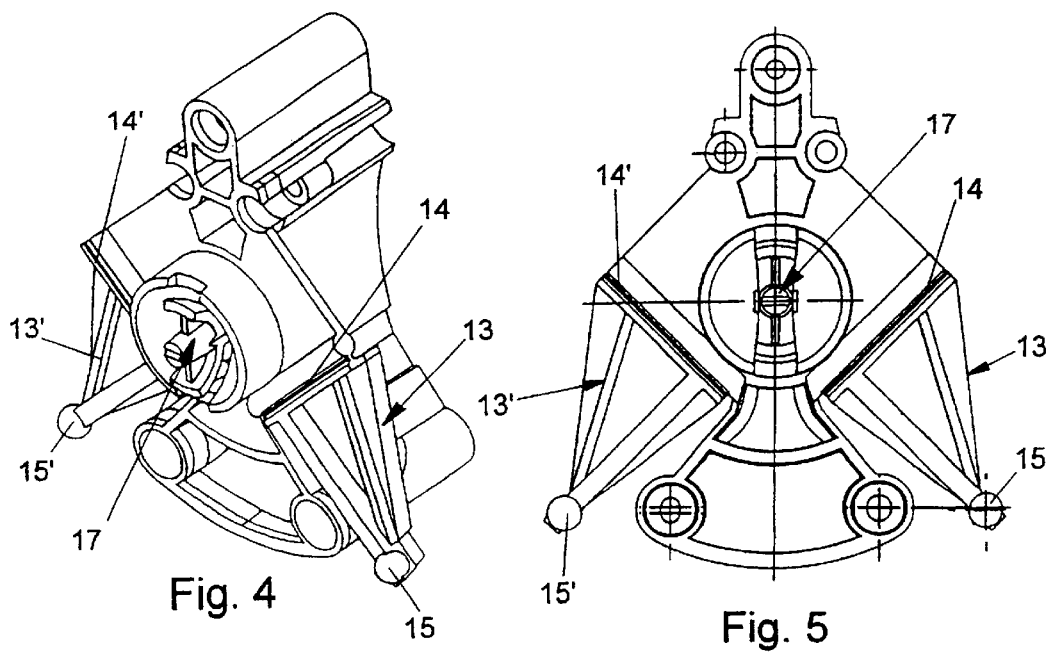
Figure 6:
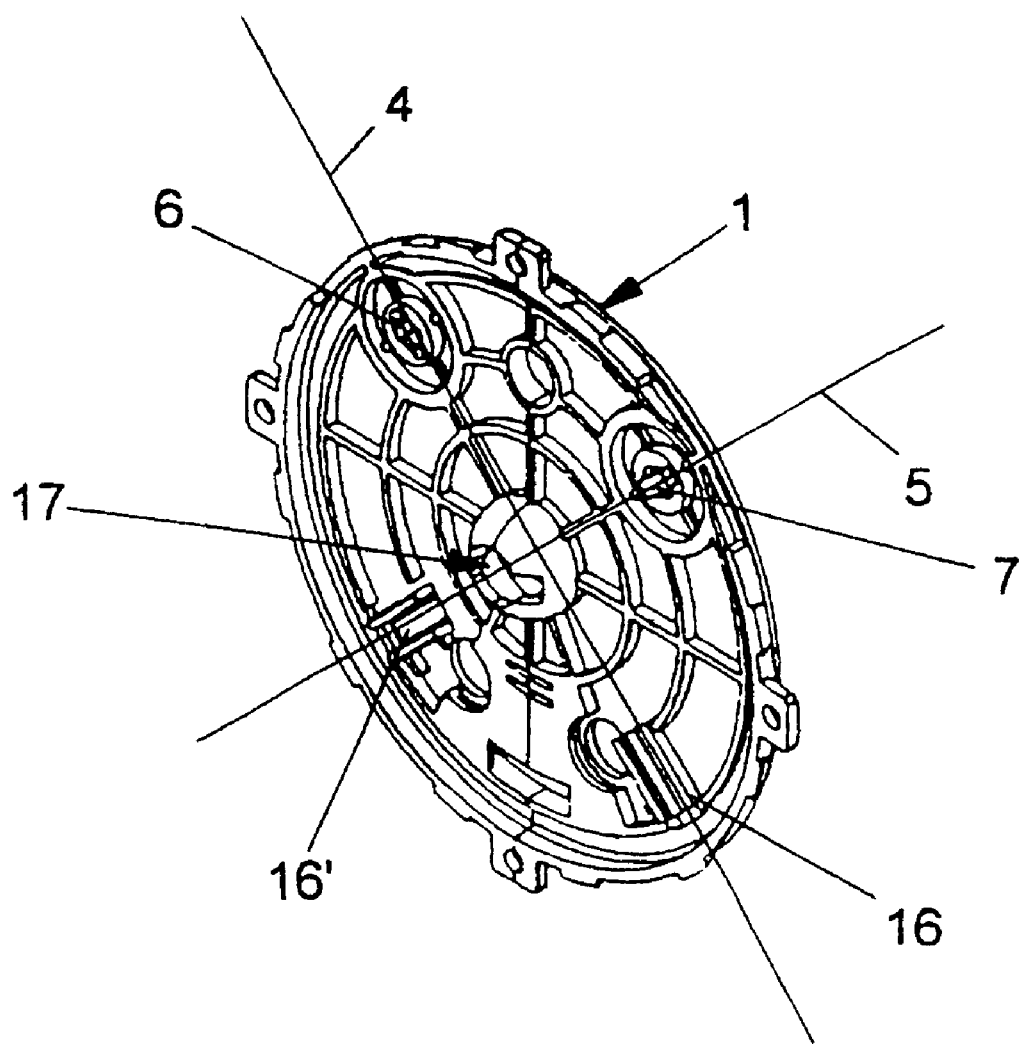
FIG. 6 is a perspective view of the mirror support in FIG. 3.

FIG. 2 schematically represents the movement mechanism of the mirror support 1 about the axis 5 relative to the mounting plate 2 for the embodiment designated in FIG. 1B. Designated on the mounting plate 2 are the means needed for the rotation about the axis 5, viz. a motor 10, a transmission element 11 and a spindle 12 which, upon energization of the motor, can perform in this case a vertical translation movement upwards or downwards, depending on the direction of rotation of the motor. The damping element 9, which is active between the mirror support 1 and the mounting plate 2, comprises a supporting element 13, which is provided with a pivot 14 with a pivoting axis parallel to the rotation axis 5. The lower portion of this supporting element 13 is mounted on the mounting plate 2. The upper end of this supporting element 13 is provided with a spherical projection 15, which is confined within a slot 16 under the mirror support 1, but is movable in this slot, in the longitudinal direction thereof. To that end, the slot 16 is directed in the direction of the rotation axis 4. Upon a rotation of the mirror support 1 about the axis 5, effected by the motor 10, the end of the supporting element 13 moves through the slot, as is indicated in FIG. 2 by the broken line. The frictional force thereby experienced by the spherical projection 15 in the slot 16 is such that vibrations of the mirror support about the axis 5 are sufficiently suppressed in the stationary condition, while, further, acoustic vibrations, if any, upon rotation of the mirror support are thereby prevented. What is described here for a rotation about the axis 5 is equally true of a rotation about the axis 4. FIGS. 3–6 represent a concrete exemplary embodiment of a mirror support 1 (FIGS. 3 and 6) and the coupling between the mirror support 1 and mounting plate 2, arranged on the mounting plate 2 and cooperating with the mirror support 1. This coupling comprises a ball joint construction 17 which defines the pivoting point for the mirror support 1 and the supporting elements 13, 13'. The pivoting axes 14, 14' of these supporting elements extend parallel to the respective rotation axes 5, 4 and are formed by a thinned edge or fold edge provided in the respective supporting elements 13, 13'. Owing to the frictional force sustained by each of the spherical projections 15, 15' in the respective slots 16, 16', in each of the damping elements 8, 9 a damping of vibrations and acoustic vibrations relating to movements about the respective axes 4, 5 is obtained.

The invention is not limited to the exemplary embodiment described with reference to the drawings, but comprises all kinds of modifications thereof, naturally insofar as they fall within the scope of protection of the appended claims. Thus, the damping elements 8 and 9, such as they are represented in FIGS. 2–6 and are applied in a concept according to FIG. 1B, can also be applied in a concept according to FIG. 1A. Further, the supporting element can have a variety of possible forms, while the pivot of a supporting element can be designed not only as a thinned edge or fold edge, but also, for instance, as a real pivot, parallel to the rotation axes. The length of the slots can be chosen randomly, although giving the slots a certain length limits the stroke of the supporting element in a slot, which in turn limits the rotation of the mirror housing relative to the mounting plate.

What is claimed is:

1. A damping mechanism for a mirror of a motor vehicle wherein a mirror support (1), having a mirror plate thereon, is movable about two mutually perpendicular axes (4, 5) relative to a mounting plate (2) fixedly present in the housing of the mirror plate (2), between the mirror support (1) and the mounting plate (2) at least two damping elements (8, 9) being arranged, each of said damping elements (8, 9) being made up of a slot (16) present on the mirror support (1), or on the mounting plate (2), and a hinging supporting element (13) present on the mounting, plate (2) or the mirror support (1), respectively, whose end is movable in a slot (16), characterized in that the supporting element (13) is provided, at the one free end, with a spherical projection (15) which, upon movement of the mirror support (1) relative to the mounting plate (2), moves through the slot (16).

2. A damping mechanism according to claim 1, characterized in that at least two of the damping elements (8, 9) are arranged at a distance from the pivoting point (3) of the mirror support relative to the mounting plate (2), the lines through the pivot points and each of the damping element centers including an angle of about 60° and 120°, preferably at an angle of 90°.

3. A damping mechanism according to claim 1, characterized in that the mirror plate is adjustable about said axes (4, 5) by two motor-driven spindles mounted on the mounting plate (2), and that the damping elements (8, 9) are arranged diametrically relative to the respective engagement points (6, 7) of the spindles on the mirror support (1), between the mirror support (1) and the mounting plate (2).

4. A damping mechanism according to claim 1, characterized in that the supporting element (13) is formed with a foldable edge which forms the hinge by which the supporting element (13) is mounted on the mounting plate (2) or on the mirror support (1) for hinging motion, parallel to a respective axis (4, 5).

5. A mirror for a vehicle according to claim 1, comprising a mirror support, having a mirror plate thereon, which is movable about two mutually perpendicular axes (4, 5) relative to a mounting plate (2) fixedly present in the housing of the mirror plate, characterized in that damping elements (8, 9) are present.

* * * * *